March 15, 1966     J. A. KOMISAREK     3,241,008
SOLID ELECTROLYTIC CAPACITOR WITH LAYER COMPRISING SILICA
ON THE ELECTROLYTE LAYER
Filed Dec. 1, 1961
FIG. I.
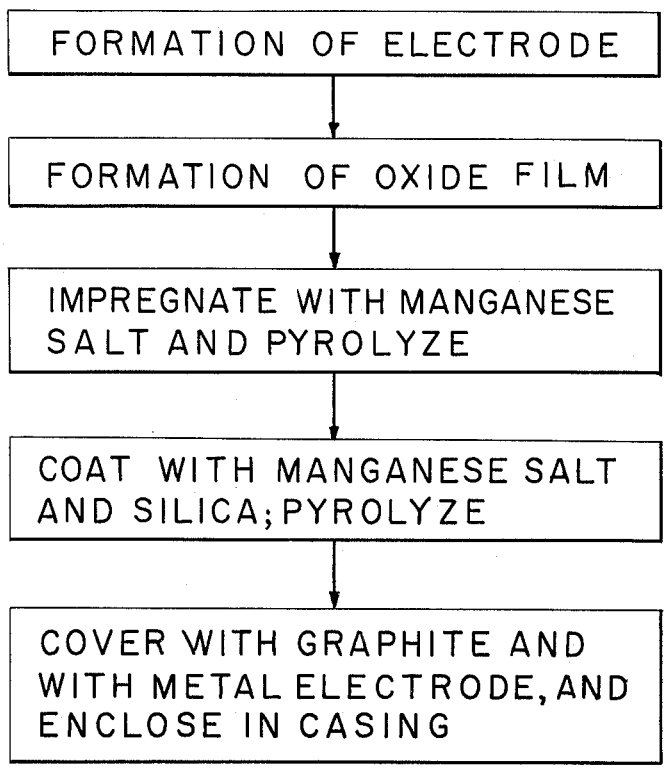
FIG. 2.
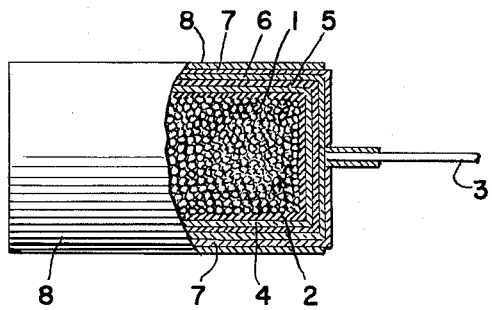
INVENTOR
Joseph A. Komisarek
BY  *Connolly and Hutz*
ATTORNEYS 3,241,008
SOLID ELECTROLYTIC CAPACITOR WITH LAYER COMPRISING SILICA ON THE ELECTROLYTE LAYER
Joseph A. Komisarek, Manchester, N.H., assignor to Sprague Electric Company, North Adams, Mass., a corporation of Massachusetts
Filed Dec. 1, 1961, Ser. No. 156,274
9 Claims. (Cl. 317—230)

This invention relates to anodes for solid electrolyte capacitors and more particularly to the preparation of solid electrolyte capacitor anodes of uniform profile.

Solid electrolyte capacitors comprise a sintered anode pellet formed with a dielectric oxide on the surfaces of the particles of the pellet and have a dry solid electrolyte positioned in and around the pores of the pellet. These anodes are incorporated in a suitable casing after the application of the cathode or counterelectrode to the solid electrolyte. This assembly of the completed capacitor into its final form places certain requirements upon the capacitor unit in order to insure the uniformity of the finished product both in size and performance.

The dry solid electrolyte is produced in connection with the anode body by an impregnation and coating of the anode body with a decomposable manganous salt from a solution of the salt such as manganous nitrate. The manganous nitrate is pyrolytically decomposed to manganese dioxide in situ on the pellet.

After the production of the manganese dioxide in repeated applications, the resultant unit with the dry solid electrolyte in place must be fitted in to a suitable casing to produce a useful capacitor. The production of the manganese dioxide on the pellet results in an outer layer of indeterminate dimension having a plurality of extending rough areas or burrs, and which may vary from unit to unit in successive production of a number of units.

In order to smooth the surface, it has been necessary in the past to mechanically abrade the burrs from the pellet, as by means of a grinder. The rough coating of $MnO_2$ on the lead wire must be removed by a sand-blasting operation. It is evident that this smoothing operation involves a considerable loss of time and material, and that it would be desirable to be able to produce a smooth pellet initially so as to dispense with the grinding and sand-blasting. Accordingly, the main object of this invention is to provide a process for producing a smooth manganese dioxide-coated tantalum pellet at the end of the impregnation and firing stages, thereby dispensing with the need for grinding off burrs and other protrusions from the pellet.

In general, this objective is achieved by increasing the viscosity of the manganese salt impregnant by the addition of a finely divided silica thereto; specifically, a finely divided chemically pure moisture-free silica is incorporated in the manganous salt solution so as to convert the latter into a viscous thixotropic paste; when this is coated on the tantalum pellet, a smooth uniform bubble-free coating results after the pellet is fired.

The invention is illustrated by the accompanying drawings in which FIGURE 1 is a flowsheet of the process and FIGURE 2 illustrates a partial section of the finished capacitor.

Referring to FIGURES 1 and 2, the electrode is first fabricated from tantalum by known methods, viz., compressing and sintering tantalum particles to form a rigid porous sintered cylinder 1. This is given an oxide film by being made the anode in an electrolytic bath, forming an anodic dielectric film 2 of $Ta_2O_5$ (tantalum oxide) on the electrode. An anode lead 3, preferably of tantalum, is attached to the sinter either by embedding it therein during pressing or by subsequent welding. The anodized tantalum cylinder is then dipped in an aqueous solution of $Mn(NO_3)_2$ and subsequently fired at a temperature and for a time sufficient to form an $MnO_2$ coating 4.

This requires a firing temperature of about 300°–450° C. so as to thermally decompose the $Mn(NO_3)_2$ to the oxide. The impregnation with $Mn(NO_3)_1$ and subsequent thermal decomposition to the oxide may be repeated one or more times to insure a thorough impregnation so as to fill the pores of the sinter 1, preferably with an intermediate step of re-anodizing in a weak electrolyte bath to heal the oxide film. To this point, the process is conventional and does not require a more detailed explanation than that set forth above.

The anodized electrode with its $MnO_2$ coating 4 is now dipped into a thixotropic mixture of manganous nitrate and finely divided silica, hereafter referred to as a manga-gel. This will be discussed at more length subsequently; but in one specific embodiment, it was prepared by mixing 2.5 parts by weight of silica with 100 parts by weight of $Mn(NO_3)_2$ before dipping the electrode therein.

After the dipping step, the electrode is let stand for a few minutes, say 10 minutes, at room temperature and then fired in the kiln as described above. Dipping in the manga-gel is repeated several times, the dipped electrode being let stand in an 85° C. oven for about 5 minutes before firing. Three dips in the manga-gel are preferred. The firing converts the manga-gel to an $MnO_2$—$SiO_2$ film 5; the fired pellet is smooth and free of the burrs developed in conventional procedures. No milling or grinding is required. The lead wire 3 is also free of oxide because the viscous manga-gel does not creep up on the lead wire.

The electrode is then replaced in an electrolytic bath such as ammonium chloride or oxalic acid and reformed for a short time as in the healing step referred to above. This is a safety measure to heal any cracks in the oxide film that are the result of thermal damage during the pyrolysis steps. The coating is still such that the reformation electrolyte can contact the base tantalum metal at any break in the oxide.

After this, the electrolyte is coated with a thin film of graphite 6, as by immersion in an aqueous suspension of graphite, followed by drying. A metal electrode coating 7 is then applied over the graphite by known means, and the unit is sealed in a can 8.

The silica is added to the manganous nitrate in an amount of about 0.5% to about 4%. The preferred form of the silica is chemically pure, expanded and moisture-free and in a very fine state of subdivision, e.g., 0.015–0.02 micron. Such a product is sold under the tradenames Cabosil of Cabot and Santocel of Monsanto. This material is a fine white dust resembling a talcum powder.

It is believed that the bubbles of manganese dioxide which form on the surface of conventional pellets are caused by gases from the decomposition of the nitrate in the inner pores. The inventor believes that, in the old method, the surface coating skins-over and prevents the escape of the gases. The theory of this invention is that the very porous silica permits most of the gases evolved during pyrolysis to escape. This eliminates gas bubbles in the coating. Regardless of theory, the finished product of this invention is a very smooth pellet, so smooth that the grinding step is not required. The fired manga-gel coating is believed to consist of $MnO_2$ with particles of silica embedded therein. As explained above, the reason that the sand-blasting step is not needed is believed to have a more straight-forward explanation, in that the addition of the silica produces a viscous solution with the manganous nitrate that does not creep up the lead wire. Also, its viscosity permits better control of the dipping step.

The foregoing description of the invention is to be considered as illustrative of the invention but does not limit it to the specific materials described. For example, other oxygen-containing salts of manganese may be employed in place of manganese nitrate. The details of anodizing, forming an $MnO_2$ coating, reforming, etc., are disclosed in greater detail in U.S. 2,936,514 and are described here only to the extent necessary to form the setting for the invention, which is the production of a smooth coat on an oxide-coated tantalum electrode by means of an oxygen-containing manganese salt solution containing a dry pure finely divided silica dispersed therein.

What is claimed is:

1. A process of producing a uniform solid electrolyte on a sintered tantalum pellet for combination in a solid electrolyte capacitor which comprises impregnating a porous body of sintered surface-oxidized tantalum particles with a manganous salt solution, thermally decomposing the salt to the oxide, repeating the impregnation and decomposition a multiplicity of times to substantially completely fill the interstices between the particles, coating the resulting body with a viscous mixture of finely divided silica and additional manganous salt, and then calcining the coated body to form a smooth surface thereon.

2. Process of claim 1 wherein the silica content of the silica-manganous salt mixture is about 0.5–5% by weight based on the weight of the manganous salt.

3. Process of claim 1 wherein the viscous mixture of silica and manganous salt is a thixotropic mixture.

4. A process for the production of a smooth-surfaced solid cylindrical electrode which comprises repeatedly impregnating with a manganous salt a cylindrical body composed of sintered and surface-oxidized tantalum particles, firing the impregnated body after each impregnation to thermally decompose the salt to manganese oxide, whereby the interstices of the cylinder are filled with manganese oxide, dipping the resulting cylinder in a viscous dispersion of finely divided silica suspended in a manganous salt solution, and calcining the dipped article to convert the resultant dip-coating to a smooth film of manganese oxide and silica.

5. The process of claim 4 wherein the steps of dipping the cylinder in said dispersion and then calcining are repeated successively.

6. The process of claim 4 wherein the dipped cylinder is calcined at a temperature of 300°–450° C.

7. A solid electrolytic capacitor comprising a porous anode core of sintered particles of an oxidizable metal, a dielectric oxide film on the surface of the particles, an electrolyte layer of manganese dioxide covering the surface of the dielectric oxide film in the pores and on the surface of the anode core, and a smooth coat comprising manganese dioxide and silica covering the electrolyte layer on the surface of the anode core.

8. The combination as recited in claim 7 comprising a cathode electrode layer on the surface of the manganese dioxide coat.

9. The combination as recited in claim 7 comprising a graphite layer and a cathode electrode layer on the surface of the manganese dioxide coat.

References Cited by the Examiner

UNITED STATES PATENTS

| | | | |
|---|---|---|---|
| 1,992,545 | 2/1935 | Robinson | 317—230 |
| 2,012,481 | 8/1935 | Robinson | 317—230 |
| 3,054,029 | 9/1962 | Wagner et al. | 317—230 |

JOHN W. HUCKERT, *Primary Examiner.*

JAMES D. KALLAM, *Examiner.*